(12) United States Patent
Imafuku et al.

(10) Patent No.: US 9,602,696 B2
(45) Date of Patent: Mar. 21, 2017

(54) COLOR CONVERSION METHOD, GRAY SCALE VALUE CORRECTION APPARATUS, COMPUTER PROGRAM AND DISPLAY APPARATUS

(71) Applicant: EIZO Corporation, Ishikawa (JP)

(72) Inventors: Tetsuya Imafuku, Ishikawa (JP);
Kensuke Nagashima, Ishikawa (JP);
Atsuyoshi Deyama, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 14/780,173

(22) PCT Filed: Aug. 29, 2013

(86) PCT No.: PCT/JP2013/073091
§ 371 (c)(1),
(2) Date: Sep. 25, 2015

(87) PCT Pub. No.: WO2014/155768
PCT Pub. Date: Oct. 2, 2014

(65) Prior Publication Data
US 2016/0044210 A1  Feb. 11, 2016

(30) Foreign Application Priority Data
Mar. 25, 2013  (JP) ................. 2013-062008

(51) Int. Cl.
*H04N 1/60*  (2006.01)
(52) U.S. Cl.
CPC ............. *H04N 1/6027* (2013.01); *G06T 7/11* (2017.01); *G06T 7/90* (2017.01); *H04N 1/6019* (2013.01); *G06T 2207/10024* (2013.01)
(58) Field of Classification Search
CPC .... H04N 1/6027; H04N 1/6019; H04N 1/603; H04N 1/6058; H04N 1/6025;
(Continued)

(56) References Cited

U.S. PATENT DOCUMENTS

| 5,600,764 A | 2/1997 | Kakutani |
| 5,784,065 A | 7/1998 | Kakutani |

(Continued)

FOREIGN PATENT DOCUMENTS

| JP | 2000115558 A | 4/2000 |
| JP | 2007096797 A | 4/2001 |

(Continued)

OTHER PUBLICATIONS

International Search Report dated Oct. 29, 2013 from corresponding International Application No. PCT/JP2013/073091; 2 pgs.

(Continued)

*Primary Examiner* — Jingge Wu
(74) *Attorney, Agent, or Firm* — Maier & Maier, PLLC

(57) ABSTRACT

Provided are a color conversion method, gradation value correction device, computer program, and display device that can reproduce small gradation changes between lattice points, as well as can reduce accuracy degradation caused by interpolation. Dividing one of input gradations and output gradations of gradation characteristics, indicating input/output gradation characteristics reproduced in a second conversion unit, into gradation segments having predetermined gradation intervals. Then, correcting each of the gradation values of the other gradations of the gradation characteristics so that gradation intervals of the other gradations become intervals corresponding to the predetermined gradation intervals. The first conversion unit then converts the gradation values of an image using the corrected gradation values.

5 Claims, 14 Drawing Sheets

(58) Field of Classification Search
CPC ......... H04N 1/60; G06T 7/0081; G06T 7/408; G06T 11/001
See application file for complete search history.

(56) References Cited

U.S. PATENT DOCUMENTS

| | | | | |
|---|---|---|---|---|
| 6,735,334 | B2* | 5/2004 | Roberts | H04N 1/6058 382/167 |
| 2002/0039104 | A1 | 4/2002 | Sato et al. | |
| 2002/0044150 | A1 | 4/2002 | Sato et al. | |
| 2002/0180999 | A1* | 12/2002 | Kanai | G09G 3/002 358/1.9 |
| 2003/0234785 | A1* | 12/2003 | Matsuda | H04N 5/74 345/426 |
| 2005/0264836 | A1 | 12/2005 | Gotoh et al. | |
| 2008/0158246 | A1* | 7/2008 | Ishii | G06T 7/0083 345/604 |
| 2009/0002782 | A1 | 1/2009 | Kulkarni et al. | |
| 2009/0034837 | A1* | 2/2009 | Kato | H04N 1/60 382/167 |
| 2009/0067007 | A1* | 3/2009 | Ishida | H04N 1/60 358/3.23 |
| 2010/0053426 | A1* | 3/2010 | Kawada | H04N 1/6097 348/441 |
| 2010/0208312 | A1 | 8/2010 | Hashizume | |
| 2011/0116137 | A1* | 5/2011 | Uratani | H04N 1/6058 358/3.23 |
| 2012/0188229 | A1* | 7/2012 | Wan | H04N 1/407 345/419 |

FOREIGN PATENT DOCUMENTS

| | | |
|---|---|---|
| JP | 2004266684 A | 9/2004 |
| JP | 2006197549 A | 7/2006 |

OTHER PUBLICATIONS

Extended European Search Report dated Feb. 24, 2016, in connection with corresponding EP Application No. 13880251 (10 pgs.).

* cited by examiner

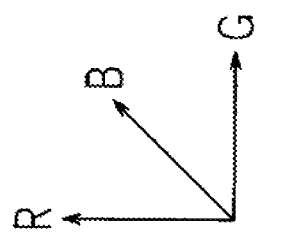
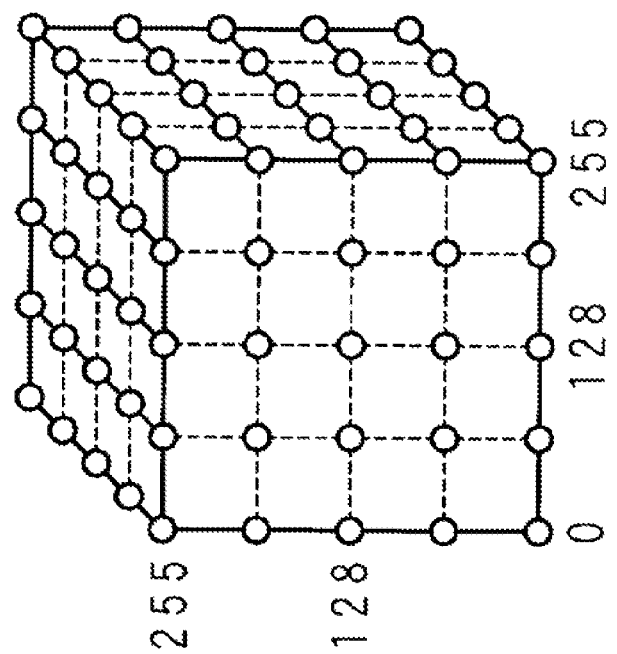
Fig. 2

Fig.8

| INPUT GRADATION | OUTPUT GRADATION |
|---|---|
| 0 | 0 |
| 1 | 1 |
| 2 | 1 |
| ... | ... |
| 253 | 254 |
| 254 | 255 |
| 255 | 255 |

COLOR CONVERSION METHOD, GRAY SCALE VALUE CORRECTION APPARATUS, COMPUTER PROGRAM AND DISPLAY APPARATUS

TECHNICAL FIELD

The present invention relates to a color conversion method which can correct gradation values when color-converting an image to reproduce the color characteristics of a target device to be emulated, a gradation value correction device, a computer program for implementing the gradation value correction device, and a display device.

BACKGROUND ART

Among techniques for converting any color is an emulation technique using a 3D lookup table (3D LUT). Unlike a table for each of R, G, and B such as a traditional 1D LUT, a 3D LUT is handled as an RGB cube-shaped, color-mixing table. Performing emulation with high color reproducibility requires generating a 3D LUT having a great number of lattice points. However, as the number of lattice points increases, the generation and operation of the 3D LUT becomes a larger load. For this reason, if R, G, and B each have, for example, 256 gradations, color conversion is typically performed by thinning out the number of lattice points to about 17×17×17 and interpolating gradation values between the lattice points.

If there is used a 3D LUT in which the number of the lattice points are thinned out, accuracy degradation (error) occurs when interpolation is performed, and the color reproducibility between the lattice points degrades. For this reason, for example, there has been proposed a method which includes color-converting R, G, and B using respective 1D LUTs and then performing color conversion using a 3D LUT.

In this method, for example, input data of each of R, G, and B is color-converted using a 1D LUT thereof, and the converted data is further color-converted using a 3D LUT. In one-dimensional conversion using each 1D LUT, common one-dimensional conversion components in three-dimensional conversion using the 3D LUT are converted; in three-dimensional conversion using the 3D LUT, three-dimensional conversion components from which the common one-dimensional conversion components are excluded are converted (see Patent Literature 1).

CITATION LIST

Patent Literature

Patent Literature 1; Japanese Unexamined Patent Application Publication No. 2007-96797

SUMMARY OF INVENTION

Technical Problem

In the method of Patent Literature 1, 1D LUT values are obtained by analyzing one-dimensional components common to the conversion coefficients of the R, G, and B axes of the 3D LUT using a statistical technique. The 1D LUTs aim to reduce the accuracy degradation caused by the interpolation of gradation values between the lattice points of the 3D LUT. For this reason, gradation changes smaller than the intervals between the lattice points of the 3D LUT cannot be reproduced. For example, it is difficult to reproduce the color characteristics of a device, such as stepwise characteristics in which the color changes every four gradations or every eight gradations. Even when stepwise small gradation changes between the lattice points can be reproduced using 1D LUTs, the accuracy degradation caused by the interpolation cannot be reduced.

The present invention has been made in view of the foregoing, and an object thereof is to provide a color conversion method that can reproduce small gradation changes between the lattice points, as well as can reduce accuracy degradation caused by interpolation, a gradation value correction device, a computer program for implementing the gradation value correction device, and a display device.

Solution to Problem

A first aspect of the present invention provides a method for color conversion using a color conversion device, the color conversion device including a first conversion unit configured to convert gradation values of an image and a second conversion unit in which conversion values are stored at lattice points which divide a color space into segments having predetermined gradation intervals, the color space having a predetermined number of gradations for each of multiple colors, the method comprising:

a step of dividing one of input gradations and output gradations of the gradation characteristics into gradation segments having the predetermined gradation intervals, the gradation characteristics indicating input/output gradation characteristics reproduced in the second conversion unit;

a step of correcting, for each of the gradation segments, each of the gradation values of the other gradations of the gradation characteristics so that gradation intervals of the other gradations become intervals corresponding to the predetermined gradation intervals;

a step of converting, by the first conversion unit, the gradation values of the image using the corrected gradation values; and a step of color-converting the image using the gradation values converted by the first conversion unit and the conversion values stored at the lattice points of the second conversion unit.

According to a second aspect of the present invention, the method for color conversion of the first aspect further comprises a step of calculating an expansion/contraction coefficient for expanding or contracting, for each of the gradation segments, the gradation interval of the other gradations so that the intervals between the other gradations corresponding to the respective gradation segments become the intervals corresponding to the predetermined gradation intervals, wherein the step of correcting gradation values comprises correcting, for each of the gradation segments, each of the gradation values of the other gradations by multiplying each of the gradation values of the other gradations by the calculated expansion/contraction coefficient.

A third aspect of the present invention provides a gradation value correction device for correcting gradation values used to convert colors of an image. The device comprises:

dividing unit configured to divide one of input gradations and output gradations of the gradation characteristics into gradation segments having predetermined gradation intervals, the gradation characteristics indicating required input/output gradation characteristics; and gradation value correction unit configured to correct, for each of the gradation segments, each of the gradation values of the other gradations of the gradation characteristics so that gradation intervals of the other gradations become intervals corresponding to the predetermined gradation intervals.

A fourth aspect of the present invention provides a computer program for correcting gradation values used to convert colors of an image. The computer program causes a computer to perform:

a step of dividing one of input gradations and output gradations of gradation characteristics into gradation segments having predetermined gradation intervals, the gradation characteristics indicating required input/output gradation characteristics; and a step of correcting, for each of the gradation segments, each of the gradation values of the other gradations of the gradation characteristics so that gradation intervals of the other gradations become intervals corresponding to the predetermined gradation intervals.

A fifth aspect of the present invention provides a display device comprising:

a first conversion unit configured to convert gradation values of an image; and a second conversion unit in which conversion values are stored at lattice points which divide a color space into segments having predetermined gradation intervals, the color space having a predetermined number of gradations for each of multiple colors, wherein the display device converts colors of the image using the first conversion unit and second conversion unit, and displays the converted image, and the first conversion unit converts the gradation values of the image using corrected gradation values, wherein each of the corrected gradation values was corrected by dividing one of input gradations and output gradations of gradation characteristics into gradation segments having predetermined gradation intervals, the gradation characteristics indicating input/output gradation characteristics reproduced in the second conversion unit, and correcting, for each of the gradation segments, each of the gradation values of the other gradations of the gradation characteristics so that gradation intervals of the other gradations become intervals corresponding to the predetermined gradation intervals.

In the first, third, fourth, and fifth aspects of the present invention, one of the input gradations and output gradations of the gradation characteristics is divided into the gradation segments having the predetermined gradation intervals, the gradation characteristics indicating required input/output gradation characteristics. For example, the gradation characteristics are gradation characteristics reproduced in the second conversion unit (e.g., 3D LUT) in which conversion values are stored at lattice points which divide a color space having a predetermined number of gradations for each of multiple colors into the segments having the predetermined gradation intervals. The divided gradations may be the input gradations of the required gradation characteristics. The predetermined gradation intervals are, for example, the intervals between the lattice points of the second conversion unit (e.g., 3D LUT). The gradation intervals may or may not be equal.

Each of the gradation values of the other gradations of the gradation characteristic are corrected, for each of the gradation segments, so that gradation intervals of the other gradations become the intervals corresponding to the predetermined gradation intervals. If the divided gradations are the input gradations of the required gradation characteristics, the other gradations are the output gradations thereof. If the numbers of the input gradations and output gradations of the first conversion unit are the same, the intervals corresponding to the predetermined gradation intervals can be the same as the predetermined gradation intervals. For example, if input gradations of the required gradation characteristics are divided into a gradation segment of 0 to 64, the maximum value of the divided gradations is 64. If the output gradations corresponding to the gradation segment of 0 to 64 of the input gradations of the required gradation characteristics are 0 to 10, the maximum value of the gradations other than the divided gradations is 10. At this time, the values of the output gradations of the required gradation characteristics are corrected so that the maximum value of the other gradations becomes 64, which is the same as the maximum value of the divided gradations. The same applies to cases where the maximum value of the input gradations of the required gradation characteristics is larger than 64. Thus, gradation intervals of the other gradations (output gradations) can be made equal to the intervals between the lattice points of the second conversion unit. Further, the gradation characteristics of each gradation segment can represent the aspect of the changes in the required gradation characteristics between the lattice points.

The first conversion unit converts the gradation values of the image using the corrected gradation values. That is, the corrected gradation values are used as the output gradation values of the first conversion unit. For example, if the input gradations of the first conversion unit are 0 to 64, the corresponding output gradation values become values indicating the aspect of the changes in the required gradation characteristics between the lattice points. Thus, the first conversion unit represents the aspect of the changes in the gradation characteristics between the lattice points of the second conversion unit and can perform a function of assigning weights for interpolation in the second conversion unit as preprocessing. That is, the second conversion unit uses the output gradation values (corrected gradation values) of the first conversion unit when performing interpolation using the conversion values stored in the lattice points. Thus, it is possible to reduce the accuracy degradation (error) between the lattice points and to reproduce small gradation changes.

In the second aspect of the present invention, there is calculated the expansion/contraction coefficient for expanding or contracting, for each of the gradation segments, the gradation intervals of the other gradations so that gradation intervals of the other gradations become the intervals corresponding to the predetermined gradation intervals. For example, it is assumed that if input gradations of the required gradation characteristics are divided into a gradation segment of 0 to 64, the interval of the output gradations (the other gradations) of the required gradation characteristics is 10. In this case, an expansion/contraction coefficient for expanding or contracting the gradation interval of 10 of the other gradations to a predetermined gradation interval (the interval of the divided gradations) of, e.g., 64 is 6.4 (64/10). That is, the gradation values of the output gradations corresponding to each gradation segment is expanded or contracted so that the difference between the minimum and maximum values of the output gradations corresponding to the gradation segment becomes the interval between the lattice points.

Subsequently, for each of the gradation segments, the values of the other gradations are corrected by multiplying the values of the other gradations by the calculated expansion/contraction coefficient. If the divided gradations (input gradations) are 0 to 64 and if a yet-to-be-corrected output gradation value of the gradation characteristics corresponding to any input gradation value (e.g., 30) is 5, the gradation value is corrected to the yet-to-be-corrected output gradation value 5× expansion/contraction coefficient 6.4=32. Thus, the gradation characteristics of each gradation segment can represent the aspect of the changes in the required gradation characteristics between the lattice points.

Advantageous Effects of Invention

According to the present invention, it is possible to reproduce the small gradation changes between the lattice points and to reduce accuracy degradation caused by interpolation.

BRIEF DESCRIPTION OF THE DRAWINGS

FIG. 2 is a diagram schematically showing an example configuration of a 3D LUT.
FIG. 8 is a diagram showing an example of the data structure of the 1D LUT.

DESCRIPTION OF EMBODIMENTS

First Embodiment

Figure 1:
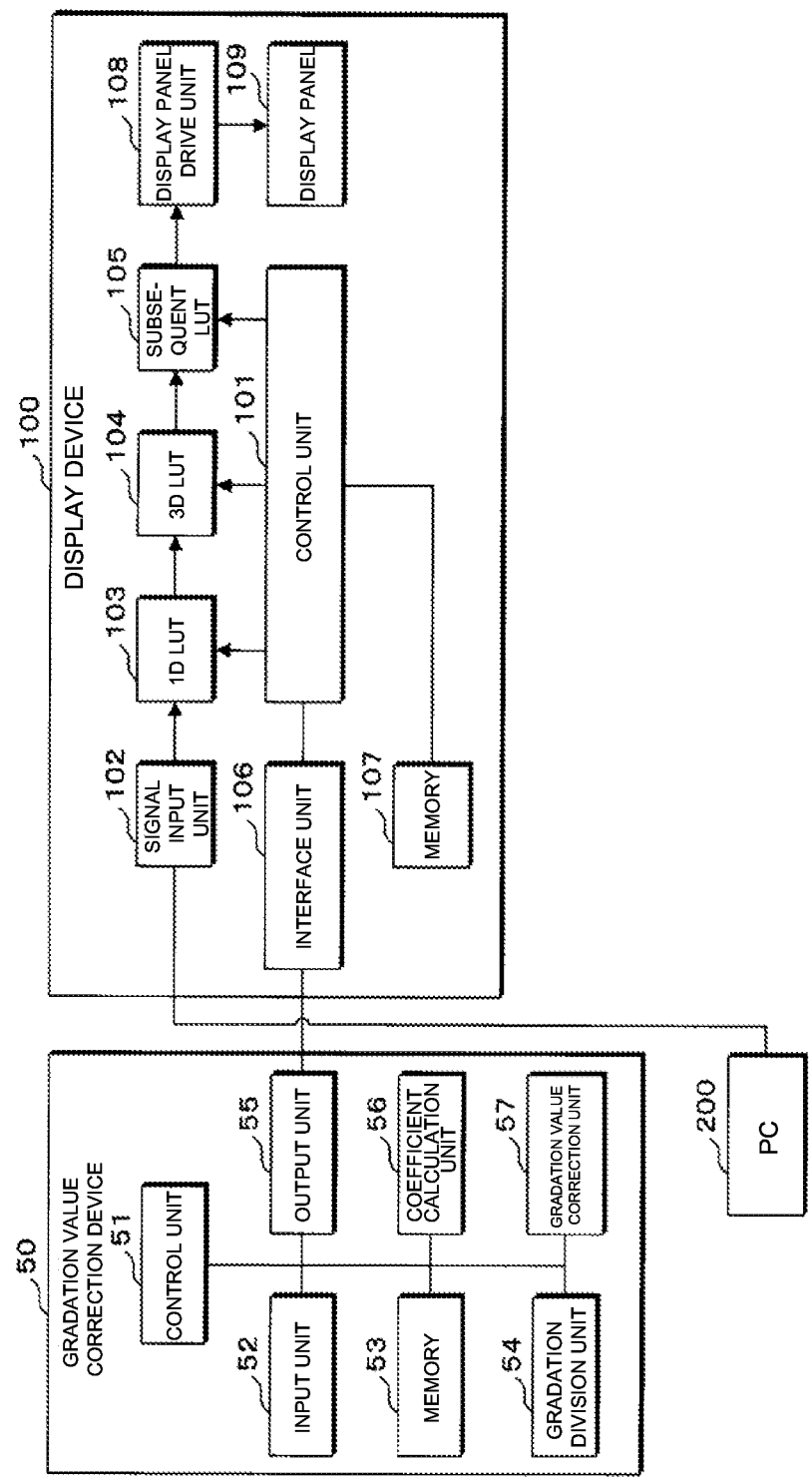
FIG. 1 is a block diagram showing an example configuration of a color conversion system of a first embodiment.

Now, there will be described a display device, a gradation value correction device, a computer program for implementing the gradation value correction device, and a color conversion method of the present invention with reference to drawings showing embodiments thereof. FIG. 1 is a block diagram showing an example configuration of a color conversion system of a first embodiment. This color conversion system includes a gradation value correction device 50, a display device 100, and a personal computer (PC) 200.

The display device 100 includes a control unit 101, a signal input unit 102, a 1D lookup table (1D LUT) 103 serving as a first conversion unit, a 3D lookup table (3D LUT) 104 serving as a second conversion unit, a subsequent LUT 105, an interface unit 106, a memory 107, a display panel drive unit 108, and a display panel 109.

The signal input unit 102 has a connection terminal connected to an external device such as the PC 200 through a cable. It receives a video signal from the PC 200 and outputs the received video signal to the 1D LUT 103. The video signal from the PC 200 received by the signal input unit 102 may be any of an analog signal and a digital signal. While R (red) G (green) B (blue) color video signals are used in the embodiments below, monochrome video signals may be used. Further, as in multi-primary color monitors, there may be used five colors consisting of the three colors, R (red), G (green), and B (blue), plus C (cyan) and Y (yellow).

The 1D LUT 103 includes, for example, LUTs each corresponding to R (red), G (green), and B (blue). In each LUT, input gradations represented by inputted video signals are associated with output gradations corresponding to the input gradations. The 1D LUT 103 has a function of color-converting an image by converting the gradation values of video signals (image). In the 1D LUT 103, for example, each input gradation consists of 8 bits. Two hundred fifty-six entries corresponding to 256 gradations of 0 to 255 are storing output gradations (output values) each represented by, for example, 8 bits. The output gradations in the 1D LUT 103 can be rewritten (updated) under the control of the control unit 101. The 1D LUT 103 has a function of assigning weights for interpolation performed by the following 3D LUT 104 as preprocessing. That is, the 1DLUT 103 can be used to assist in interpolation performed by the 3D LUT 104.

FIG. 2 is a diagram schematically showing an example configuration of the 3D LUT 104. The 3D LUT 104 schematically shows a cubic color space having sides represented by R, G, and B signals. In the 3D LUT 104, the lattice points divide, into predetermined gradation intervals, a color space having a predetermined number of gradations (e.g., 256 gradations) for each of multiple colors (e.g., R, G, and B), and conversion values are stored at the lattice points. If the number of gradations of each of R, G, and B signals is 256 (0 to 255), the total number of the lattice points in the entire 3D LUT is the third power of 256, since the R, G, and B sides each have 256 lattice points. However, the number of lattice points is thinned out in practice. In 3D LUT 104, for example, R, G, and B each have 17×17×17 (=4913) lattice points, and each lattice point stores an R, G, or B conversion value. FIG. 2 shows an example in which 5 lattice points are disposed on the R, G, and B sides at equal intervals for simplicity. That is, in the example of FIG. 2, the gradation interval between every two adjacent lattice points is 64. The gradation intervals need not necessarily be equal intervals.

By using the 3D LUT 104, the color characteristics of any display device to be emulated can be emulated on the display device 100. Specifically, gradation values indicating gradation characteristics indicating color characteristics of any display device to be emulated are stored as conversion values at the lattice points of the 3D LUT 104. When video signals (RGB input signals) are inputted to the 3D LUT 104, these signals are color-converted into video signals (R'G'B' output signals) reproducing the color characteristics of the display device to be emulated. Note that the device to be emulated is not limited to a display device and may be a printer, imaging device, or the like.

The subsequent LUT 105 includes, for example, LUTs corresponding to R (red) G (green), and B (blue). It corrects the output gradations in order to provide smooth gradation representation such that the gradation characteristics of the display panel 109 become an ideal gamma value (subsequent gamma; e.g., 2.2), and then outputs the corrected output gradations (corrected signals) to the display panel drive unit 108.

The display panel drive unit 108 includes a gate driver, a source driver, and the like and drives the display panel 109 on the basis of the corrected signals from the subsequent LUT 105.

The display panel 109 is, for example, a liquid crystal panel where a pair of glass substrates are disposed as opposed to each other; a liquid crystal layer including a liquid crystal material is formed in the gap therebetween; one of the glass substrates is provided with multiple pixel electrodes and TFTs having drains connected to the pixel electrodes; and the other glass substrate is provided with a common electrode. The gates and sources of the TFTs are connected to the output terminals of the gate driver and those of the source driver, respectively.

In the display panel 109, the TFTs of the pixels are on-off controlled by gate signals from the gate driver. When output voltages from the source driver (voltage levels inputted to the display panel 109) are applied to the TFTs of the pixels during an ON period, the optical transmittances of the pixels, which are determined by electro-optic characteristics of the liquid crystal material, are controlled so that the gradations of the image are represented.

The interface unit 106 acquires gradation values corrected by the gradation value correction device 50. Under the control of the control unit 101, the gradation values corrected by the gradation value correction device 50 are temporarily written to the memory 107, and then written to the memory 107 as output gradation values of the 1D LUT 103 at a required timing. Thus, the 1D LUT 103 is generated.

The memory 107 stores data (gradation value data) to be written to the 1D LUT 103, 3D LUT 104, and subsequent LUT 105. While gradation value data is written to each LUT by the gradation value correction device 50 through the interface unit 106, required gradation value data may be previously stored in the memory 107.

The control unit 101 controls the writing of gradation value data to the 1D LUT 103, 3D LUT 104, and subsequent LUT 105.

The gradation value correction device 50 includes a control unit 51 that controls the entire device, an input unit 52, a memory 53, a gradation division unit 54, an output unit 55, a coefficient calculation unit 56, and a gradation value correction unit 57. The gradation value correction device 50 can be implemented, for example, by a personal computer which can execute a computer program (application).

The input unit 52 acquires gradation characteristics indicating input/output gradation characteristics reproduced in the 3D LUT 104 from an external device such as a personal computer, a display device to be emulated, or a printer. The PC 200, which outputs video signals, and the gradation value correction device 50 may be the same personal computer.

Figure 3:
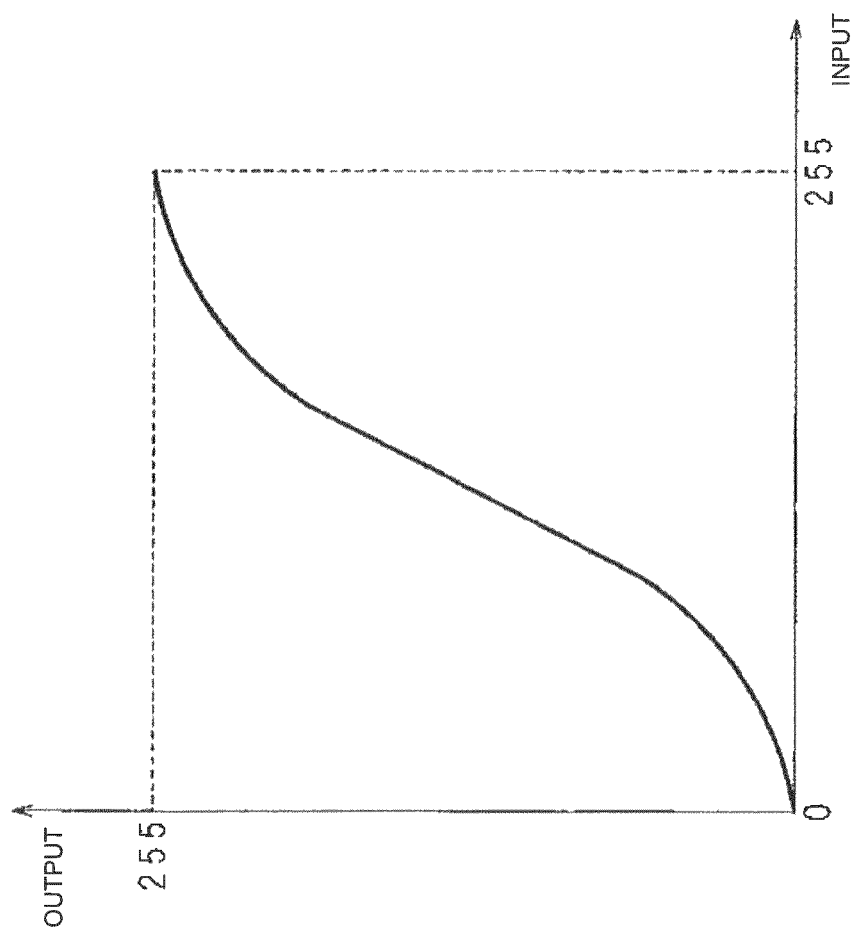
FIG. 3 is a diagram schematically showing an example of gradation characteristics of the 3D LUT.

FIG. 3 is a diagram schematically showing an example of the gradation characteristics of the 3D LUT 104. In the example of FIG. 3, the numbers of input gradations and output gradations are both 256, and one plane of the 3D LUT, for example, the gradation characteristics of R is schematically shown. The 3D LUT also has similar gradation characteristics with respect to G and B. The gradation characteristics of the 3D LUT 104 are required gradation characteristics and are the color characteristics of any display device to be emulated. The input unit 52 acquires data indicating gradation characteristics as shown in FIG. 3 with respect to each of R, G, and B.

The memory 53 stores data indicating the required gradation characteristics acquired by the input unit 52 under the control of the control unit 51.

The gradation division unit 54 serves as division means and divides one of input gradations and output gradations of gradation characteristics into gradation segments having predetermined gradation intervals, the gradation characteristics indicating the input/output gradation characteristic reproduced in the 3D LUT 104.

Figure 4:
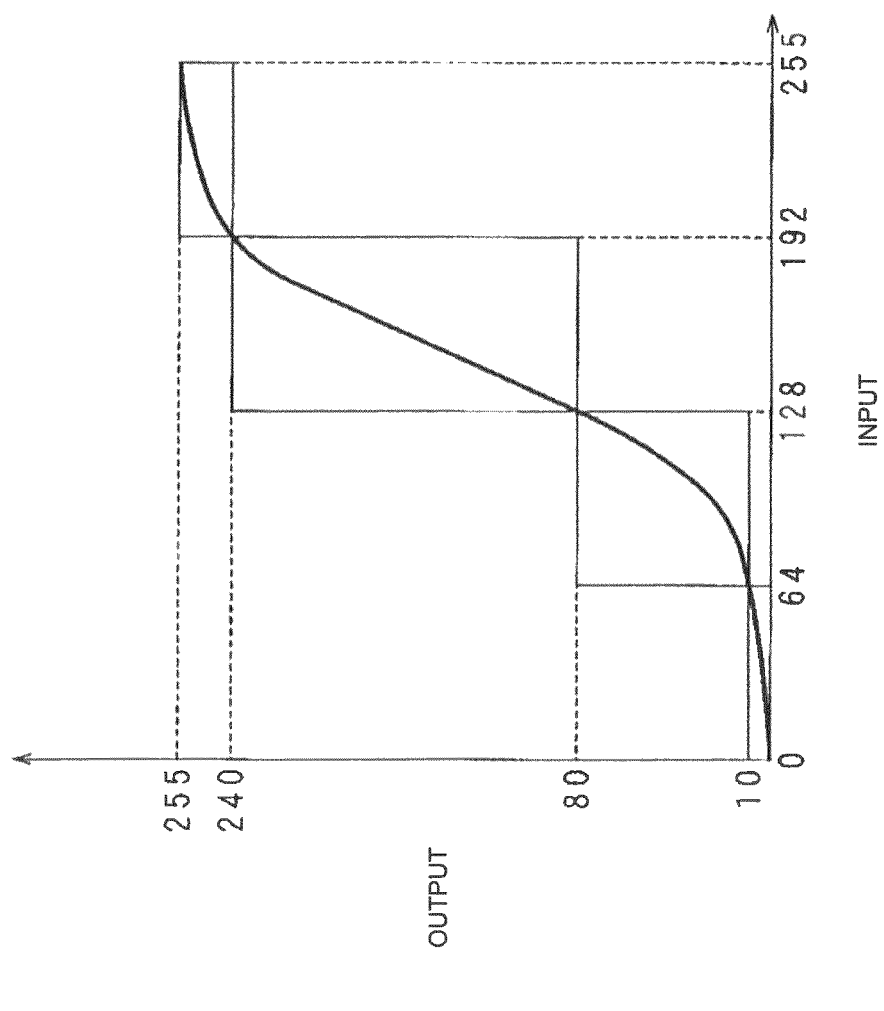
FIG. 4 is a schematic diagram showing an example of gradation characteristics divided by a gradation division unit.

FIG. 4 is a schematic diagram showing an example of gradation characteristics divided by the gradation division unit 54. The gradation characteristics shown in FIG. 4 are the same as those in FIG. 3. For simplicity, as shown in FIG. 2, all gradations 0 to 255 of each of R, G, and B are divided into segments each having 64 gradations. In other words, assuming that the number of the lattice points of each of R, G, and B is 5, the gradations 0 to 255 are divided into 4 segments.

In the example of FIG. 4, of the input gradations and output gradations of the gradation characteristics, the input gradations are divided into 4 gradation segments. The 4 gradation segments are segments: 0 to 64, 64 to 128, 128 to 192, and 192 to 255. If the input gradations are divided using gradation values 0, 64, 128, 192, and 255 as boundaries, output gradations 0, 10, 80, 240, and 255 correspond to the input gradations 0, 64, 128, 192, and 255, respectively.

As seen in FIG. 4, if the gradation characteristics are divided into 4 gradation segments, the minimum and maximum values of the output gradations corresponding to the respective gradation segments are 0 and 10, 10 and 80, 80 and 240, and 240 and 255 from the lower-left gradation segment toward the upper-right gradation segment of FIG. 4. These values do not agree with the gradation values of the lattice points 64, 128, and 192 of the 3D LUT 104 shown in FIG. 2. Specifically, if a 1D LUT 103 is generated using the gradation characteristic data (output gradations) shown in FIG. 4, output gradations corresponding to the input gradations (e.g., 64, 128, 192) corresponding to the lattice points, of the 1D LUT 103 become 10, 80, and 240 and do not agree with the lattice points of the 3D LUT 104. Consequently, the unintended output gradations corresponding to the input gradations of the 1D LUT 103 would be inputted to the 3D LUT 104.

In this case, it is considered that the lattice points of the 3D LUT 104 are changed so that the lattice points agree with 10, 80, and 240, which are the output gradations of the 1D LUT 103. However, the change of the lattice points of the 3D LUT 104 may reduce the color reproducibility of the original lattice points, which are generated from measurement values or the like. For this reason, in the present embodiment, the output gradations of the 1D LUT 103 are made to agree with the lattice points of the 3D LUT 104. This will be described below.

The gradation value correction unit 57 serves as gradation value correction means. The gradation value correction unit 57 corrects, for each of the gradation segments, the gradation values other than the input gradations or output gradations divided into the gradation segments by the gradation division unit 54 so that the gradation intervals of the other gradations become intervals corresponding to predetermined gradation intervals. For example, if the input gradations are divided, the gradations other than the divided input gradations are the output gradations.

Since the numbers of input gradations and output gradations of the 1D LUT 103 are both 256 and are the same, the intervals corresponding to the predetermined gradation intervals can be the same as the predetermined gradation intervals. For example, if the input gradations of the required gradation characteristics are divided into 4 gradation segments using gradation values 64, 128, and 192 as boundaries, as shown in FIG. 4, the gradation segments of the divided input gradations each have an interval of 64. Accordingly, the output gradation values of the gradation characteristics are corrected so that the intervals between the output gradations (the other gradations) corresponding to the respective gradation segments also become 64, which is the same as the intervals between the input gradations.

Figure 5:
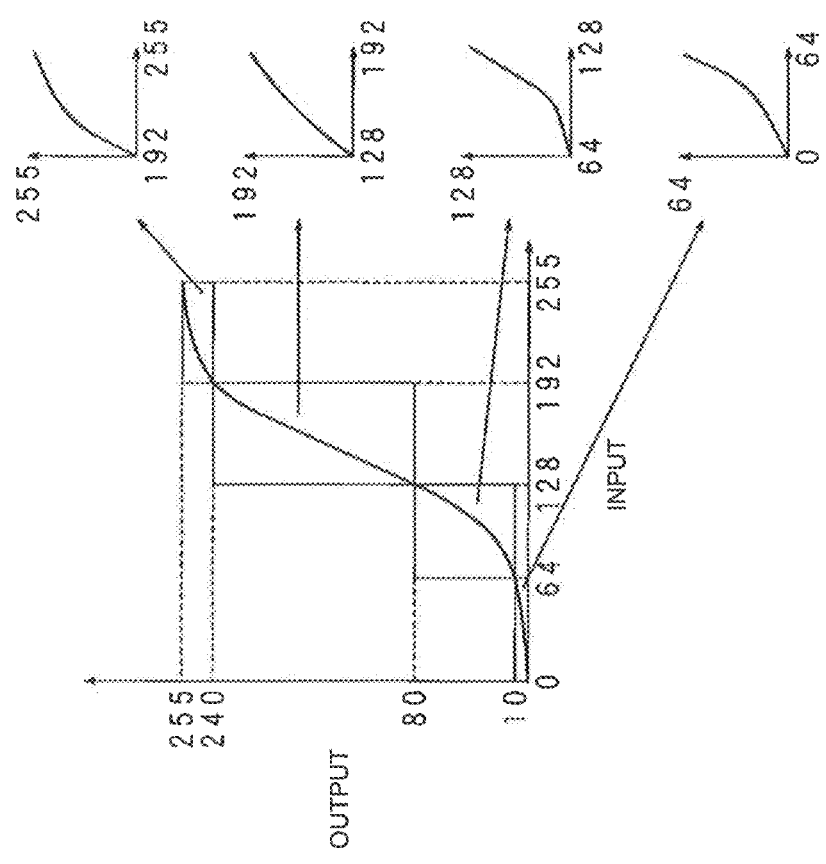
FIG. 5 is a schematic diagram showing an example of the correction of the output gradation values of the gradation characteristics by a gradation value correction unit.

FIG. 5 is a schematic diagram showing an example of the correction of the output gradation values of the gradation characteristics by the gradation value correction unit 57. As shown in FIG. 5, the output gradation values corresponding to the gradation segment of 0 to 64 of the input gradations are corrected so that the minimum and maximum values thereof are changed from 0 and 10 to 0 and 64.

Similarly, the output gradation values corresponding to the gradation segment of 64 to 128 of the input gradations are corrected so that the minimum and maximum values thereof are changed from 10 and 80 to 64 and 128.

Similarly, the output gradation values corresponding to the gradation segment of 128 to 192 of the input gradations are corrected so that the minimum and maximum values thereof are changed from 80 and 240 to 128 and 192.

Similarly, the output gradation values corresponding to the gradation segment of 192 to 255 of the input gradations are corrected so that the minimum and maximum values thereof are changed from 240 and 255 to 192 and 255. That is, the output gradation values corresponding to each gradation segment are corrected, that is, expanded or contracted so that the minimum and maximum values thereof become the gradation values specifying the lattice points of the 3D LUT 104.

Thus, the intervals between the output gradations corresponding to the respective gradation segments can be made equal to the intervals between the lattice points of the 3D LUT 104. Further, the gradation characteristics of each gradation segment can represent the aspect of changes in the required gradation characteristics between the lattice points of the 3D LUT 104.

There will be described in more detail the method of normalizing, that is, expanding or contracting the output gradation values corresponding to the gradation segments obtained by dividing the required gradation characteristics in accordance with the lattice points of the 3D LUT 104.

The coefficient calculation unit 56 serves as coefficient calculation means. The coefficient calculation unit 56 calculates an expansion/contraction coefficient for expanding or contracting the interval of the output gradations (the other gradations) corresponding to each gradation segment so that the interval of the output gradations becomes an interval corresponding to a predetermined gradation interval.

For example, as shown in FIG. 5, the output gradation values corresponding to the gradation segment of 0 to 64 of the input gradations have a minimum value of 0 and a maximum value of 10 and an interval of 10. For this reason, an expansion/contraction coefficient for expanding or contracting the output gradation interval of 10 to 64, which is the corresponding input gradation interval, is 6.4 (64/10).

Similarly, the output gradation values corresponding to the gradation segment of 64 to 128 of the input gradations have a minimum value of 10 and a maximum value of 80 and an interval of 70. For this reason, an expansion/contraction coefficient for expanding or contracting the output gradation interval of 70 to 64, which is the corresponding input gradation interval, is about 0.9 (64/70).

Similarly, the output gradation values corresponding to the gradation segment of 128 to 192 of the input gradations have a minimum value of 80 and a maximum value of 240 and an interval of 160. For this reason, an expansion/contraction coefficient for expanding or contracting the output gradation interval of 160 to 64, which is the corresponding input gradation interval, is 0.4 (64/160).

Similarly, the output gradation values corresponding to the gradation segment of 192 to 255 of the input gradations have a minimum value of 240 and a maximum value of 255 and an interval of 15. For this reason, an expansion/contraction coefficient for expanding or contracting the output gradation interval of 15 to 64, which is the corresponding input gradation interval, is about 4.3 (64/15). In this way, the intervals between the output gradations corresponding to the gradation segments are expanded or contracted so that the difference between the minimum and maximum values of the output gradations corresponding to each gradation segment becomes the interval between the lattice points.

There are some methods for correcting the output gradation values. A first method features the use of a function indicating the required gradation characteristics (e.g., a function for outputting an output gradation using an input gradation as a variable). Specifically, the first method includes multiplying output gradation values obtained by inputting the input gradations to this function by the calculated expansion/contraction coefficient and reassigning the resulting values as output gradations corresponding to the input gradations.

A second method includes separately storing the required gradation characteristics with more gradations than the 255 gradations of the 1D LUT 103, for example, 1024 gradations, multiplying the output gradations of the required gradation characteristics by the calculated expansion/contraction coefficient, restoring the resulting values to 256 gradations, and reassigning the resulting values as the outputs of the 1D LUT 103.

A third method includes correcting output gradation values corresponding to each gradation segment by multiplying the output gradation values by the calculated expansion/contraction coefficient. For example, an expansion/contraction coefficient for expanding or contracting the interval of the output gradations corresponding to the gradation segment of 0 to 64 of the input gradations is 6.4. Accordingly, the output gradation values corresponding to the gradation segment of 0 to 64 of the input gradations can be corrected by multiplying the output gradation values by the expansion/contraction coefficient 6.4. If a yet-to-be-corrected output gradation value of the gradation characteristics corresponding to any input gradation value (e.g., 30) is 5, the gradation value is corrected to the yet-to-be-corrected output gradation value 5× expansion/contraction coefficient 6.4=32.

Similarly, an expansion/contraction coefficient for expanding or contracting the interval of the output gradations corresponding to the gradation segment of 64 to 128 of the input gradations is 0.9. Accordingly, the output gradation values corresponding to the gradation segment of 64 to 128 of the input gradations can be corrected by multiplying the output gradation values by the expansion/contraction coefficient 0.9. If a yet-to-be-corrected output gradation value of the gradation characteristics corresponding to any input gradation value (e.g., 70) is 20 with respect to a minimum value of 10, the gradation value is corrected to the yet-to-be-corrected output gradation value 20× expansion/contraction coefficient 0.9=18. In this case, the minimum value in the output gradation interval corresponding to the gradation segment 64 to 128 of the input gradations is 64. Accordingly, the gradation value is corrected to 64+18=82 with respect to the minimum value.

Similarly, an expansion/contraction coefficient for expanding or contracting the interval of the output gradations corresponding to the gradation segment of 128 to 192 of the input gradations is 0.4. Accordingly, the output gradation values corresponding to the gradation segment of 128 to 192 of the input gradations can be corrected by multiplying the output gradation values by the expansion/contraction coefficient 0.4. If a yet-to-be-corrected output gradation value of the gradation characteristics corresponding to any input gradation value (e.g., 140) is 25 with respect to a minimum value of 80, the gradation value is corrected to the yet-to-be-corrected output gradation value 25× expansion/contraction coefficient 0.4=10. In this case, the minimum value in the output gradation interval corresponding to the gradation segment 128 to 192 of the input gradations is 128. Accordingly, the gradation value is corrected to 128+10=138 with respect to the minimum value.

Similarly, an expansion/contraction coefficient for expanding or contracting the interval between the output gradations corresponding to the gradation segment of 192 to 255 of the input gradations is 4.3. Accordingly, the output gradation values corresponding to the gradation segment of 192 to 255 of the input gradations can be corrected by multiplying the output gradation values by the expansion/contraction coefficient 4.3. If a yet-to-be-corrected output gradation value of the gradation characteristics corresponding to any input gradation value (e.g., 220) is 5 with respect to a minimum value of 240, the gradation value is corrected to the yet-to-be-corrected output gradation value 5× expansion/contraction coefficient 4.3=21.5. In this case, the minimum value in the output gradation interval corresponding to the gradation segment 192 to 255 of the input gradations is 192. Accordingly, the gradation value is corrected to 192+21.5=213.5 with respect to the minimum value.

Thus, the gradation characteristics of each gradation segment can represent the aspect of the changes in the required gradation characteristics between the lattice points.

Figure 6:
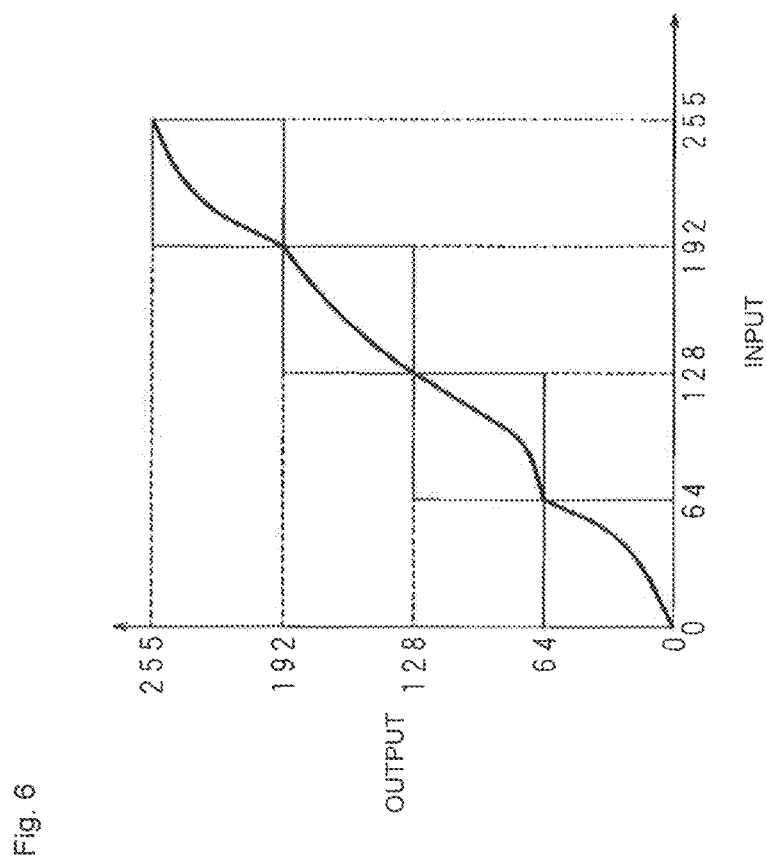
FIG. 6 is a schematic diagram showing an example of gradation values corrected by a gradation value correction device of the first embodiment.

FIG. 6 is a schematic diagram showing an example of the gradation values corrected by the gradation value correction device 50 of the first embodiment. The output gradation values shown in FIG. 6 are generated by connecting the gradation values corrected for each of the gradation segments shown in FIG. 5 in such a manner that the corrected gradation values correspond to the input gradation values 0 to 255. The corrected gradation values shown in FIG. 6 are data to be written as the output gradations of the 1D LUT 103.

The output unit 55 outputs the gradation values corrected by the gradation value correction unit 57 to the interface unit 106 of the display device 100. The control unit 101 of the display device 100 writes the corrected gradation values to the 1D LUT 103 at a required timing. Thus, the 1D LUT 103 is generated. Alternatively, the output unit 55 may write the gradation values corrected by the gradation value correction unit 57 directly to the 1D LUT 103.

Figure 7:
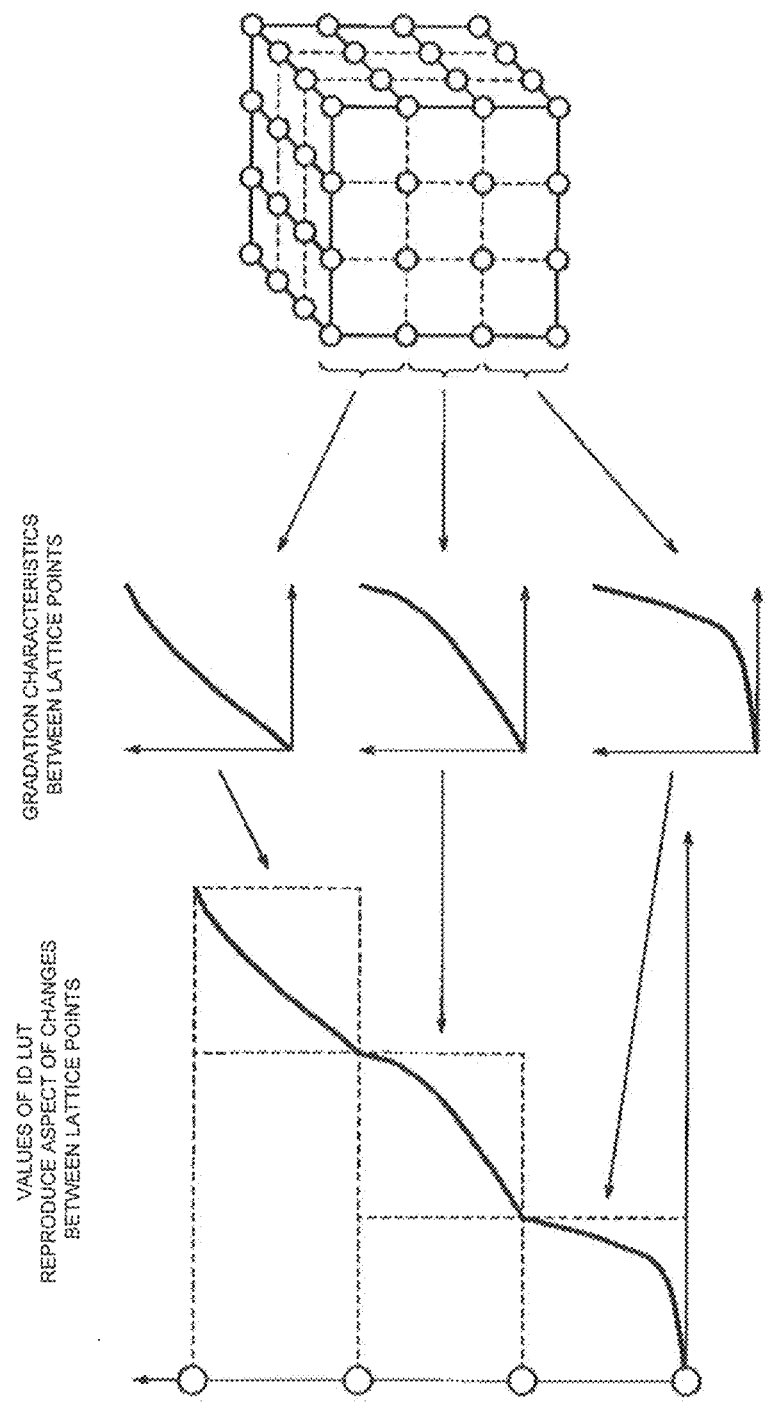
FIG. 7 is a schematic view showing an example of a method for generating a 1D LUT.

FIG. 7 is a schematic view showing an example of a method for generating a 1D LUT 103. While FIG. 7 shows a method for generating a 1DLUT 103 for one of the RGB colors, the same applies to the other colors. Shown in the right part of FIG. 7 is a 3D LUT 104 for reproducing gradation characteristics to be emulated. For example, the 3D LUT 104 includes lattice points obtained by thinning out the gradations 0 to 255 of each of R, G, and B, and the lattice points store conversion values for color conversion.

Next, as shown in the center of FIG. 7, the gradation characteristics to be emulated are divided into gradation segments corresponding to the intervals between the lattice points of the 3D LUT 104, for each of R, G, and B. Further, as shown in the left part of FIG. 7, a 1D LUT 103 is generated in such a manner that the values thereof reproduce the aspect of the changes in the gradation characteristics of each gradation segment and can be suitably inputted to the 3D LUT 104.

FIG. 8 is a diagram showing an example of the data structure of the 1D LUT 103. While FIG. 8 shows an example of a 1DLUT 103 for one of R, G, and B, the same applies to the other colors. As shown in FIG. 8, the 1D LUT 103 includes input gradations and output gradations corresponding to the input gradations. For example, if a gradation value 121 is inputted to the 1D LUT 103, an output gradation corresponding to the input gradation 121 is outputted to the 3D LUT 104. The output gradations in the 1D LUT 103 represent the aspect of the changes in the required gradation characteristics between the lattice points.

Figure 9:
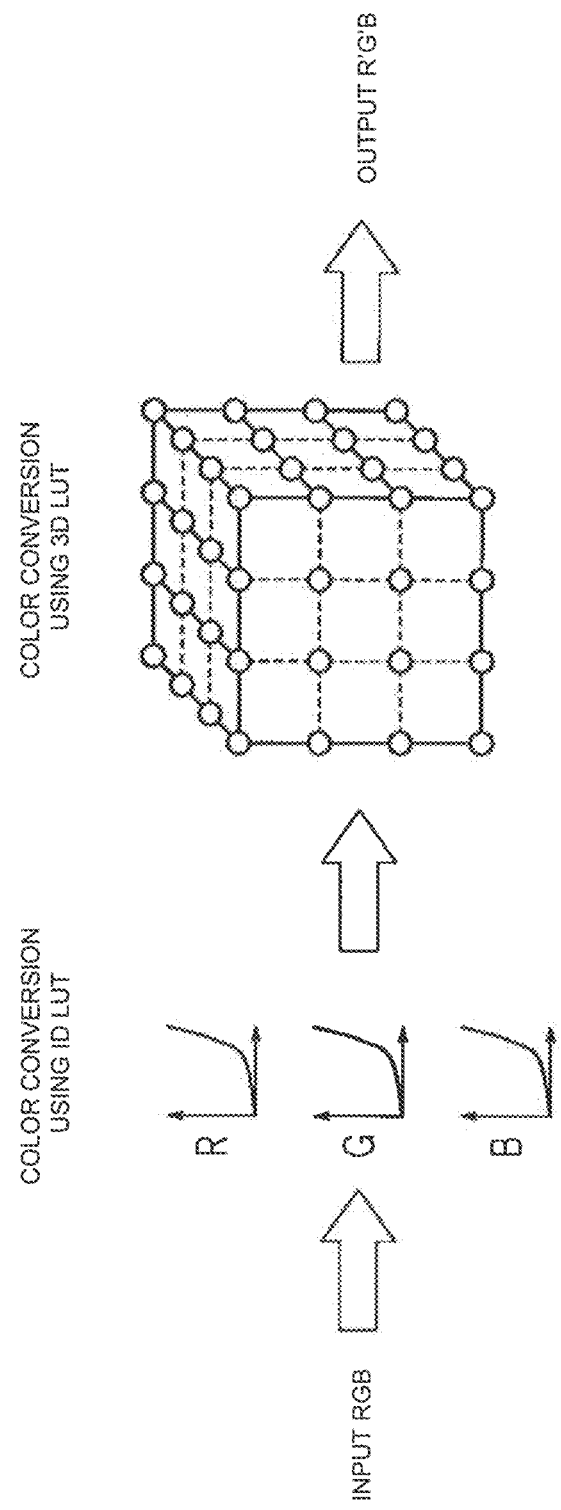
FIG. 9 is a schematic diagram showing an example of a color conversion method using the color conversion system of the first embodiment.

FIG. 9 is a schematic diagram showing an example of a color conversion method using the color conversion system of the first embodiment. The video (image) input signals (RGB gradation values) are inputted to the 1D LUTs of the 1D LUT 103 corresponding to R, G, and B.

Each 1D LUT of the 1D LUT 103 outputs output gradation values corresponding to the inputted gradation values to the 3D LUT 104. The 3DLUT 104 receives the output gradation values and calculates conversion values corresponding to the inputted RGB gradation values by interpolation.

Next, there will be described advantages that the color conversion system of the first embodiment can reduce accuracy degradation (error) caused by interpolation, as well as can reproduce small gradation changes between the lattice points.

Figure 10:
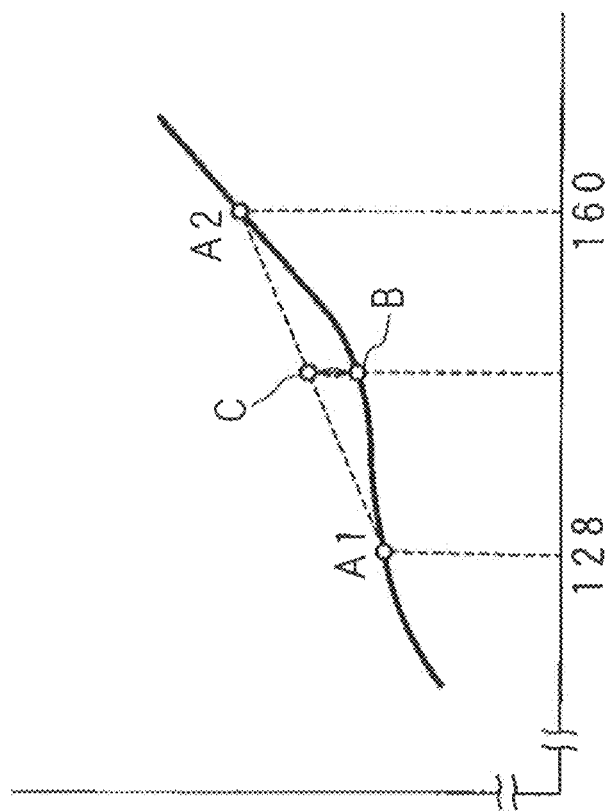
FIG. 10 is a schematic diagram showing an example of the aspect in which the color conversion system of the first embodiment reduces accuracy degradation caused by interpolation.

FIG. 10 is a schematic diagram showing an example of the aspect in which the color conversion system of the first embodiment reduces accuracy degradation caused by interpolation. FIG. 10 shows the gradation values 128 and 160 as examples of the lattice points of the 3D LUT 104. A curve in FIG. 10 schematically shows the required gradation characteristics. In color conversion using a traditional 3D LUT, an output gradation value corresponding to any input gradation value between the gradation value 128 of a lattice point A1 and the gradation value 160 of a lattice point A2 is obtained as the calculated conversion value of a point C interpolated, for example, linearly, between a conversion value stored at the lattice point A1 and a conversion value stored at the lattice point A2. For this reason, accuracy degradation (error) shown by an arrow occurs between the actual conversion value shown by B (i.e., a gradation value of the required gradation characteristics) and the conversion value calculated by interpolation.

In the present embodiment, the 1D LUT 103 outputs, as an output gradation value corresponding to any input gradation value between the gradation value 128 of the lattice point A1 and the gradation value 160 of the lattice point A2, a gradation value approximate to the aspect of the changes in the required gradation characteristics (corrected gradation value) to the 3D LUT 104. Thus, accuracy degradation caused by interpolation can be reduced.

Figure 11:
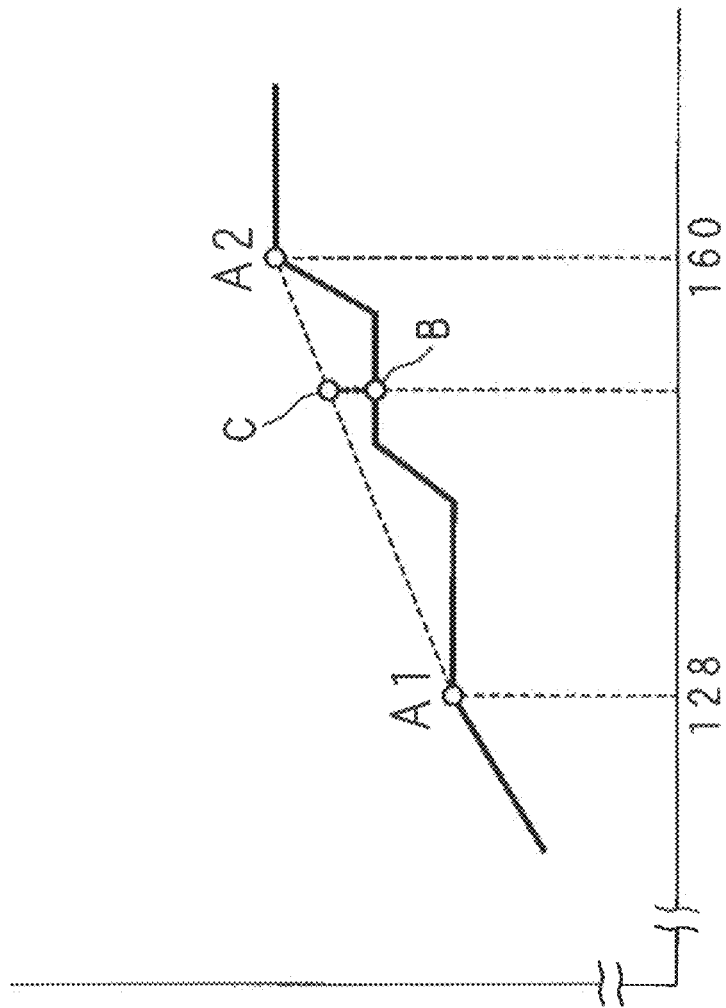
FIG. 11 is a schematic diagram showing an example of the aspect in which the color conversion system of the first embodiment reduces accuracy degradation caused by interpolation and reproduces small gradation changes between the lattice points.

FIG. 11 is a schematic diagram showing an example of the aspect in which the color conversion system of the first embodiment reduces accuracy degradation caused by interpolation and reproduces small gradation changes between the lattice points. Stepwise gradation changes as shown in FIG. 10 are gradation changes which can be seen in a display device having a lower gradation representation capability than the display device of the present embodiment. As with FIG. 10, FIG. 11 shows the gradation values 128 and 160 as examples of the lattice points of the 3D LUT 104. A curve in FIG. 11 schematically shows the required gradation characteristics. In color conversion using a traditional 3D LUT, an output gradation value corresponding to any input gradation value between the gradation value 128 of a lattice point A1 and the gradation value 160 of a lattice point A2 is obtained as the calculated conversion value of a point C interpolated, for example, linearly, between a conversion value stored at the lattice point A1 and a conversion value stored at the lattice point A2. For this reason, accuracy degradation (error) shown by an arrow occurs between the actual conversion value shown by B (i.e., a gradation value of the required gradation characteristics) and the conversion value calculated by interpolation.

In the present embodiment, the 1D LUT 103 outputs, as an output gradation value corresponding to any input gradation value between the gradation value 128 of the lattice point A1 and the gradation value 160 of the lattice point A2, a gradation value approximate to the aspect of the changes in the required gradation characteristics (corrected gradation value) to the 3D LUT 104. Thus, accuracy degradation caused by interpolation can be reduced. As a result, it is possible to emulate the representation on a display device which has a lower gradation representation capability than the display device of the present embodiment.

While the numbers of input gradations and output gradations of the 1D LUT 103 are the same, that is, 256 in the present embodiment, these numbers may be different. Hereafter, there will be described a case in which the number of input gradations of the 1D LUT 103 is 1024 and the number of output gradations thereof is 256, which is the same as the number of gradations of the 3D LUT 104.

Figure 12:
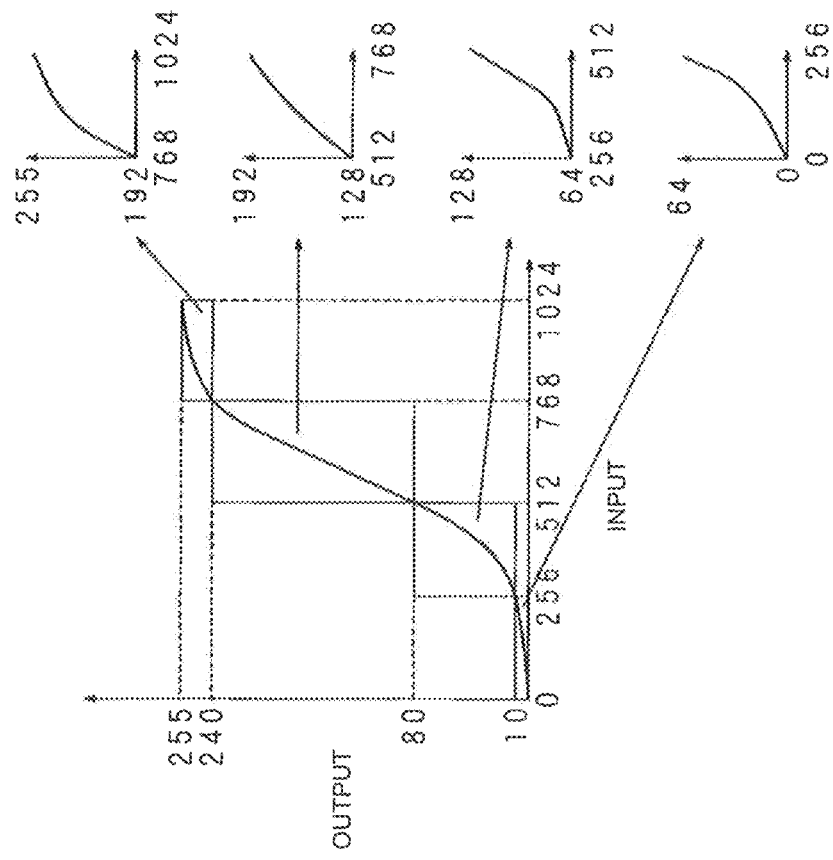
FIG. 12 is a schematic diagram showing another example of the correction of the output gradation values of the gradation characteristics by the gradation value correction unit.

FIG. 12 is a schematic diagram showing another example of the correction of the output gradation values of the gradation characteristics by the gradation value correction unit 57. In the example of FIG. 12, the number of input gradations of the 1D LUT 103 is 1024, which is four times larger than the number of output gradations. For this reason, the predetermined gradation interval used when the gradation division unit 54 divides the gradations into gradation segments is set to that which is four times larger than the interval between the lattice points. In the example of FIG. 12, the gradations are divided into gradation segments using points having gradation values 256, 512, and 768, as boundaries. That is, the gradation segments each have an interval of 256 gradations.

In this case also, the gradation value correction unit 57 corrects the output gradation values of gradation characteristics corresponding to the input gradations divided into the gradation segments by the gradation division unit 54 so that the intervals of the output gradations corresponding to the respective gradation segments become intervals corresponding to predetermined gradation intervals (that is, become 64 gradations, which are one-fourth the predetermined gradation interval of 256 gradations).

As shown in FIG. 12, the output gradation values corresponding to the gradation segment of 0 to 256 of the input gradations are corrected so that the minimum and maximum values thereof are changed from 0 and 10 to 0 and 64.

Similarly, the output gradation values corresponding to the gradation segment of 256 to 512 of the input gradations are corrected so that the minimum and maximum values thereof are changed from 10 and 80 to 64 and 128.

Similarly, the output gradation values corresponding to the gradation segment of 512 to 768 of the input gradations are corrected so that the minimum and maximum values thereof are changed from 80 and 240 to 128 and 192.

Similarly, the output gradation values corresponding to the gradation segment of 768 to 1024 of the input gradations are corrected so that the minimum and maximum values thereof are changed from 240 and 255 to 192 and 255. That is, the output gradation values corresponding to each gradation segment can be corrected, that is, expanded or contracted so that the minimum and maximum values of the output gradations corresponding to each gradation segment become the gradation values specifying the lattice points of the 3D LUT 104.

Figure 13:
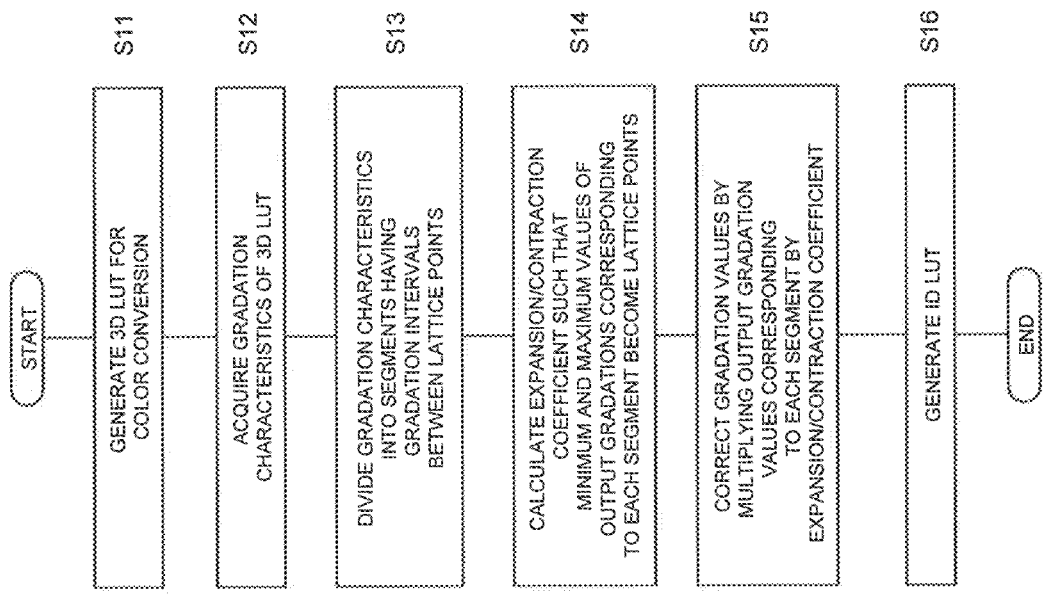
FIG. 13 is a flowchart showing an example of the steps of a color conversion process using the color conversion system of the first embodiment.

Next, there will be described a color conversion method using the color conversion system of the present embodiment. FIG. 13 is a flowchart showing an example of the steps of a color conversion process using the color conversion system of the first embodiment. For the sake of convenience, it is assumed in FIG. 13 that steps S11 and S16 are performed by the control unit 101 of the display device 100 and that steps S12 to S15 are performed by the control unit 51 of the gradation value correction device 50.

The control unit 101 of the display device 100 generates a 3D LUT 104 for color conversion on the basis of data from the gradation value correction device 50 (S11). The 3D LUT is, for example, a table in which 17×17×17 lattice points are provided for each of R, G, and B. The 3D LUT 104 may be a table in which R, G, and B are converted into R, G, and B, or may be a table in which R, G, and B are converted into X, Y, and Z, or may be a table in which other colors such as C, M, Y, and K are converted. The number of lattice points is not limited to 17×17×17. The 3D LUT 104 may be generated by another device.

The control unit 51 of the gradation value correction device 50 acquires the gradation characteristics of the 3D LUT 104, which is previously stored in the memory 53 or the like (S12). The control unit 51 may acquire the gradation characteristics of the 3DLUT 104 from the display device 100 or another device. The gradation characteristics of the 3D LUT 104 are those which are yet to be thinned out using lattice points. For example, if R, G, and B are each represented by 8 bits, R, G, and B each have 256 gradations. The gradation characteristics may be the gradation characteristics of each of R, G, and B, or may be gray-scale characteristics.

The control unit 51 then divides the input gradations of the acquired gradation characteristics into segments having the gradation intervals between the lattice points of the 3D LUT 104 (S13). The control unit 51 then calculates an expansion/contraction coefficient such that the minimum and maximum values of the output gradations corresponding to each gradation segment become the lattice points (S14).

The control unit 51 then corrects the output gradation values corresponding to each gradation segment by multiplying the output gradation values by the calculated expansion/contraction coefficient (S15). Thus, the gradation characteristics to be emulated are normalized for each of the intervals between the lattice points of the 3D LUT 104 (i.e., for each of the gradation segments).

The control unit 51 then outputs the corrected gradation values to the display device 100, and the control unit 101 of the display device 100 writes the corrected gradation values to the 1D LUT 103 to generate the 1D LUT 103 (S16), thereby ending the process. Alternatively, the control unit 51 may directly generate a 1D LUT 103 by outputting the corrected gradation values to the display device 100.

Steps S12 to S16 of FIG. 13 may be performed by previously recording a computer program describing the steps in a recording medium, loading the recorded computer program into the RAM of a computer using the recording medium reader of the computer having the CPU, RAM and other units, and causing the CPU of the computer to execute the computer program.

Second Embodiment

While the gradation value correction device 50 corrects gradation values for generating a 1D LUT 103 in the above embodiment, the display device 100 may correct gradation values for generating a 1D LUT 103.

Figure 14:
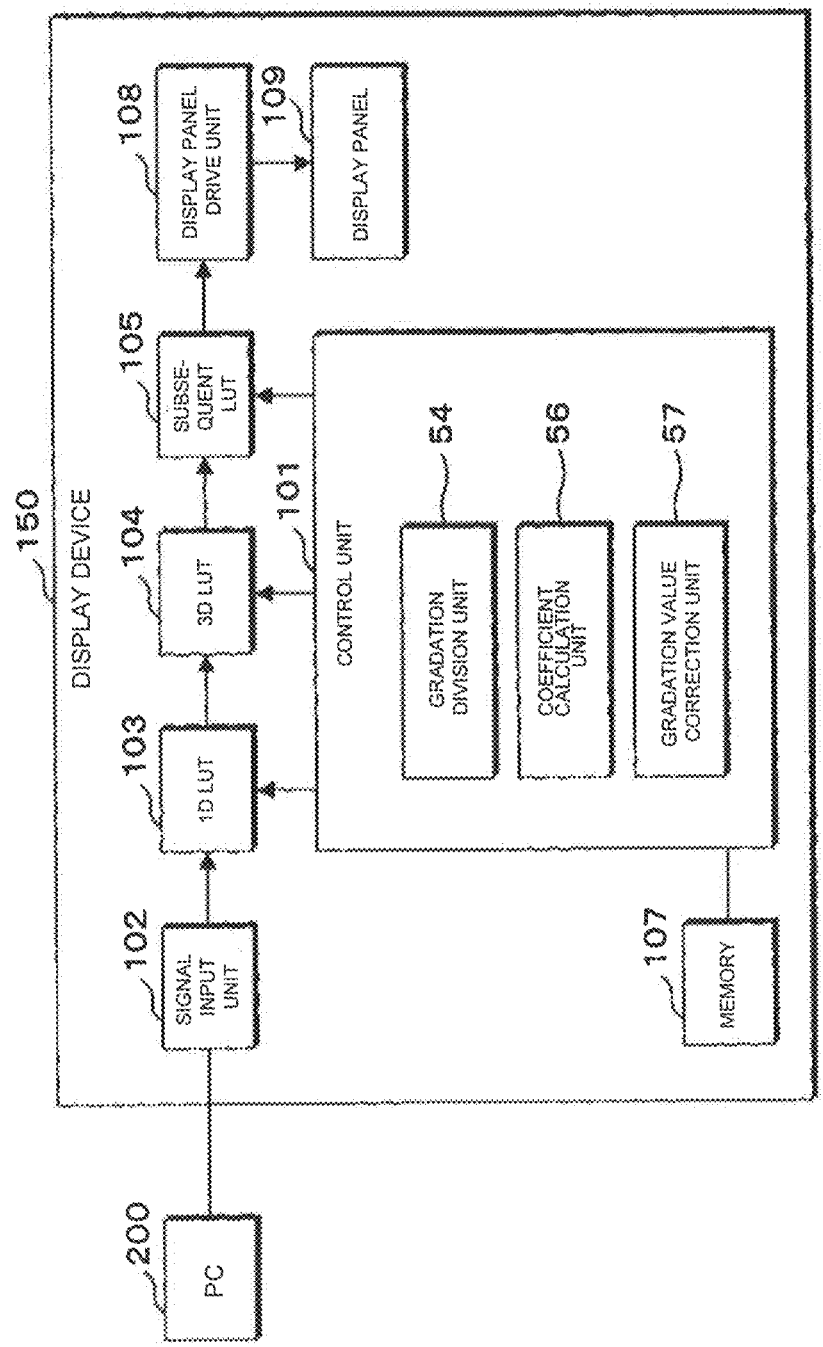
FIG. 14 is a block diagram showing an example configuration of a color conversion system of a second embodiment.

FIG. 14 is a block diagram showing an example configuration of a color conversion system of a second embodiment. As shown in FIG. 14, in a display device 150 of the second embodiment, a control unit 101 includes the gradation division unit 54, coefficient calculation unit 56, and gradation value correction unit 57 included in the gradation value correction device 50 of the first embodiment. The control unit 101, a 1D LUT 103, and a 3D LUT 104 form a color conversion device. The configurations and functions of the gradation division unit 54, coefficient calculation unit 56 and gradation value correction unit 57 are similar to those in the first embodiment and therefore will not be described.

According to the second embodiment, as in the first embodiment, the output gradation values of the 1D LUT can reproduce the aspect of the changes in the required gradation characteristics to be emulated between the lattice points. Thus, it is possible to reproduce the small gradation changes between the lattice points and to reduce accuracy degradation caused by interpolation. In particular, the representation on a display device (mobile terminal, etc.) having a lower representation capability than the display device of the present embodiment can be effectively emulated on the display device of the present embodiment.

Further, the 1D LUT of the present embodiment reproduces the aspect of the gradation changes in the gradation intervals between the lattice points. For this reason, it can perform a function of assigning weights for interpolation in the 3D LUT as preprocessing. Thus, even if traditional interpolation is performed in the 3D LUT, it is possible to reduce the accuracy degradation between the lattice points or reproduce the small gradation changes therebetween. Further, since the original lattice points in the 3D LUT can be used, it is possible to prevent the degradation of the color reproducibility on the lattice points.

The algorithm for correcting gradation values described in the above embodiments can be used when generating parameters (gradation values) set in the 1D LUT or 3D LUT of the display device. The algorithm for correcting gradation values described in the above embodiments can be also used when generating color characteristic information such as an ICC profile. Specifically, required color characteristic information can be generated by inputting the gradation value data corrected in the above embodiments to an application for generating color characteristic information. Color characteristic information is information about color characteristics included in an individual device such as a monitor, for example, an ICC profile conforming to the International Color Consortium (ICC) standard. The color characteristic information is not limited to an ICC profile and may be any other form of color characteristic information such as a WCS profile.

While the input gradations of the required gradation characteristics are divided into gradation segments having the intervals between the lattice points in the above embodiments, there may be employed another method which includes dividing the output gradations of the required gradation characteristics into gradation segments having the intervals between the lattice points and expanding or contracting the interval of input gradations corresponding to each gradation segment.

While the 1D LUTs for R, G, and B precede the 3D LUT in the above embodiments, a 1D LUT(s) for one or two of R, G, and B may be provided in accordance with the required gradation characteristics. Further, the 1D LUTs for R, G, and B may be the same 1D LUT.

While the input image is converted with respect to the different three colors, R, G, and B, in the above embodiments, some or all of multiple colors may be the same colors. Specifically, the above embodiments can be used to control a monochrome liquid crystal panel obtained by removing color filters from a color liquid crystal panel. While such a monochrome liquid crystal panel provides multi-gradation representation by driving the pixels (sub-pixels), which originally represent R, G, and B, with different gradations, use of the above embodiments allows such a monochrome liquid crystal panel to provide finer monochrome representation.

DESCRIPTION OF NUMERALS

50 gradation value correction device
51 control unit
52 input unit
53 memory
54 gradation division unit
55 output unit
56 coefficient calculation unit
57 gradation value correction unit
100 display device
101 control unit
102 signal input unit
103 1D LUT
104 3D LUT
105 subsequent LUT
106 interface unit
107 memory
108 display panel drive unit
109 display panel

The invention claimed is:

1. A method for color conversion using a color conversion device, the color conversion device including a first conversion unit configured to convert gradation values of an image and a second conversion unit in which conversion values are stored at lattice points, wherein the lattice points divide a color space into segments having predetermined gradation intervals, the color space having a predetermined number of gradation values for each of multiple colors, wherein the predetermined gradation intervals are intervals between the lattice points, the method comprising:

a step of dividing one of input gradations and output gradations of gradation characteristics into gradation segments having the predetermined gradation intervals, wherein the input gradations and the output gradations comprise respective gradation values, wherein the input gradations are represented by inputted video signals, and wherein the gradation characteristics are color characteristics of any display device to be emulated;

a step of correcting, for each of the gradation segments, each of the gradation values of the other gradations of the gradation characteristics by multiplying a coefficient so that gradation intervals of the other gradations become equal or proportional to the predetermined gradation intervals;

a step of converting, by the first conversion unit, the gradation values of the image using the corrected gradation values; and a step of color-converting the image using the gradation values converted by the first conversion unit and the conversion values stored at the lattice points of the second conversion unit.

2. The method for color conversion of claim 1, further comprising a step of calculating an expansion/contraction coefficient for expanding or contracting, for the gradation segments, the gradation interval of the other gradations so that the gradation intervals of the other gradations become the intervals corresponding to the predetermined gradation intervals, wherein the step of correcting gradation values comprises correcting, for the gradation segments, each of the gradation values of the other gradations by multiplying each of the gradation values of the other gradations by the calculated expansion/contraction coefficient.

3. A gradation value correction device for correcting gradation values used to convert colors of an image, the device comprising:

dividing unit configured to divide one of input gradations and output gradations of the gradation characteristics into gradation segments having predetermined gradation intervals, wherein the input gradations and the output gradations comprise respective gradation values, wherein the input gradations are represented by inputted video signals, and wherein the gradation characteristics are color characteristics of any display device to be emulated; and gradation value correction unit configured to correct, for each of the gradation segments, each of the gradation values of the other gradations of the gradation characteristics by multiplying a coefficient so that gradation intervals of the other gradations become equal or proportional to the predetermined gradation intervals.

4. A non-transitory computer readable medium for correcting gradation values used to convert colors of an image, the computer program causing a computer to perform:

a step of dividing one of input gradations and output gradations of gradation characteristics into gradation segments having predetermined gradation intervals, wherein the input gradations and the output gradations comprise respective gradation values, wherein the input gradations are represented by inputted video signals, and wherein the gradation characteristics are color characteristics of any display device to be emulated; and a step of correcting, for each of the gradation segments, each of the gradation values of the other gradations of the gradation characteristics by multiplying a coefficient so that gradation intervals of the other gradations become equal or proportional to the predetermined gradation intervals.

5. A display device comprising a gradation value correction device according to claim 3.

* * * * *